United States Patent
Morgan

[11] Patent Number: 5,937,568
[45] Date of Patent: Aug. 17, 1999

[54] FLY FISHING ROD AND REEL HOLDER

[76] Inventor: Thomas E. Morgan, 95 W. Rd., Manchester Center, Vt. 05255

[21] Appl. No.: 09/128,098

[22] Filed: Aug. 3, 1998

[51] Int. Cl.$^6$ ........................... A01K 97/10; A01K 97/08
[52] U.S. Cl. ................................................ 43/21.2; 43/26
[58] Field of Search ................ 43/21.2, 26; 206/315.11; 224/901; 190/901; 383/4; 403/108

[56] References Cited

U.S. PATENT DOCUMENTS

| D. 217,452 | 5/1970 | Jett | D22/22 |
|---|---|---|---|
| 1,903,798 | 4/1933 | Turner | 43/26 |
| 2,149,087 | 2/1939 | Fisher | 43/26 |
| 2,184,583 | 12/1939 | Danko | 43/21.2 |
| 2,591,674 | 4/1952 | Chalker | 43/26 |
| 2,650,449 | 9/1953 | Suring | 43/26 |
| 2,682,127 | 6/1954 | Binder | 43/21.2 |
| 2,902,790 | 9/1959 | Harvey | 43/26 |
| 3,624,948 | 12/1971 | De Baker, Sr. | 43/26 |
| 4,497,129 | 2/1985 | Chestnut | 43/21.2 |
| 4,523,704 | 6/1985 | Washington | 224/328 |
| 4,624,069 | 11/1986 | Schneider | 43/21.2 |
| 4,748,762 | 6/1988 | Campbell | 43/21.2 |
| 5,046,279 | 9/1991 | Smith et al. | 43/26 |
| 5,184,797 | 2/1993 | Hurner | 248/538 |
| 5,321,904 | 6/1994 | Benson | 43/21.2 |
| 5,386,932 | 2/1995 | Gross | 224/200 |
| 5,501,029 | 3/1996 | McDaniel, Sr. | 43/26 |

FOREIGN PATENT DOCUMENTS

| 1088975 | 3/1955 | France | 43/21.2 |
|---|---|---|---|
| 1114248 | 4/1956 | France | 43/21.2 |
| 1312759 | 11/1962 | France | 43/21.2 |
| 1604273 | 12/1981 | United Kingdom | 43/26 |

Primary Examiner—Michael J. Carone
Assistant Examiner—Fredrick T. French, III
Attorney, Agent, or Firm—Kevin Ellicott, Esq.

[57] ABSTRACT

A fly fishing rod and reel holder constructed to completely enclose a fly fishing reel and fly fishing rod handle comprising a container, the container being preferably "P" shaped, the container having a hollow interior compartment for the insertion therein of a fly fishing reel and fly fishing rod handle, the hollow interior having padding strips locatable therein, the container having a pivotably closable cover, the container being fixedly mounted to a supporting spike, the spike having a sharpened end for insertion into soil or like material.

4 Claims, 3 Drawing Sheets

FLY FISHING ROD AND REEL HOLDER

B CROSS REFERENCE TO OTHER APPLICATIONS

This is the first submission of an application for this article of manufacture. There are no other applications, provisional or non provisional.

C FEDERALLY SPONSORED RESEARCH AND DEVELOPMENT

There are no federally sponsored or funded research or development projects or undertakings in any way associated with the instant invention.

D BACKGROUND OF THE INVENTION

1. Field of the Invention

The instant invention relates to that field of devices consisting of articles of manufacture known as holders for fishing rods. Specifically, the instant invention is a holder for protecting a fly rod and reel while in use, but not being held.

2. Background Information

The prior art known to applicant discloses that rod and reel holders constructed in various configurations are well known. Unfortunately, none of the holders known to Applicant are designed specifically to accommodate and protect a rod and reel combination useful in fly fishing.

In the prior art, fishing pole holders have generally been constructed to serve one of two purposes. The first purpose served in the prior art is to simply embrace the reel while it is being transported or while it is being used, but not held by the fisherman. An example of this sort of holder may be found in U.S. Pat. No. 2,504,385, issued to L. A. Braatz on Apr. 18, 1950. When configured in this fashion, that portion of the reel which is not embraced by the holder is exposed to splashing water (often salt water), and unwanted debris such as sand and dirt. Furthermore, the rod handle juts out and away from the holder. The rod handle is exposed to the same elements noted above. Worse still, by sticking out in such a manner, the rod handle can easily be bumped, potentially dislodging the rod/reel from the holder. Furthermore, if the fisherman accidentally bumps into the handle while moving about, the handle can be broken or snapped free of the stationary reel.

Such exposure was not an overwhelming concern when fishing, rods and reels were relatively inexpensive. In the event that the reel became damaged due to the elements, or the rod was damaged accidentally while the reel was in the holder, the average fisherman could usually afford to simply purchase a replacement. However, with the advent of saltwater fly fishing, and significant increases in the purchase price of all fly fishing rods and reels this calculation has changed. For example, the modem saltwater fly rod and reel is a fairly expensive piece of equipment, with inexpensive models costing hundreds of dollars and expensive ones costing thousands of dollars. Clearly, any holder to be used in conjunction with these expensive saltwater rod/reels should be constructed so as to offer the maximum protection possible. In the case of the prior art reel holders, that level of protection is not available.

The second purpose served in the prior art is to embrace the handle portion of the rod while it is being transported or while it is being used, but not held by the fisherman. An example of this sort of holder (a rod-only holder) may be found in U.S. Pat. No. 5,501,027, issued to J. L. Acker on Mar. 26, 1996. When configured in this fashion, the entire reel is exposed to splashing water (often salt water), and unwanted wind borne debris such as sand and dirt.

An additional drawback of the rod-only holder is that it is utterly unamenable to use with a fly rod, instead being configured to accommodate a general purpose rod and reel. The general purpose rod and reel is proportioned differently from a fly rod. The reel mounted on a general purpose rod is usually locatable some distance from the end of the rod most proximate to the reel, that is, the reel is farther up the rod, more toward the eyelets of the rod and farther from the end of the rod held in the fisherman's hand.

The fly rod and reel is proportioned quite differently. On a fly rod, the mounting for the reel is located very near to the end of the pole at which it would be held, were it a general purpose rod. In fact, the fly rod is actually held by the fisherman in a different way than the general purpose rod. When using a fly rod, the rod is gripped above the reel, the hand of the fisherman being placed between the reel and the rod eyelets. Consequently, the handle end of the fly rod does not extend very far past the mounted fly rod reel. Essentially, the reel of a fly rod is mounted nearly at the end of the rod, while the general purpose rod has its reel mounted about one third of the way up the rod, toward the eyelets.

The difficulty of using a holder constructed for use with a general purpose reel should now be apparent. The rod-only holder is constructed so that the end of the rod most proximate to the reel may be inserted into the holder. These holders are usually tubular in construction, a configuration most suitable for holding the cylindrical fishing rod. The prior art reveals that when using the rod-only holder, the fisherman inserts the handle end of the rod into the holder, and the reel comes to rest on the holder, the holder having too small a diameter to accommodate the reel.

This sort of holder will not work when used with a fly rod. As has been noted above, the fly rod has little to no handle extending below the reel. Hence, the prior art rod-only holders simply will not work satisfactorily with a fly rod. There is too little rod handle available to be inserted into the rod-only holder for the fly rod/reel to be safely maintained in place.

Applicant is aware of no other fishing rod and reel holder specifically adapted for use with a fly rod and reel such that the rod and reel are held safely stationary and unwanted materials are prevented from contacting the fly reel, while the rod is not being held by the fisherman.

E SUMMARY OF THE INVENTION

The instant invention is a rod and reel holder specifically designed to safely hold a fly rod and reel. The instant invention differs from the prior art in that it protects the saltwater reel from dust, dirt and water while the rod is not being held by the fisherman. Furthermore, the holder provides a safe area in which to store the saltwater fly rod and reel when not being held by the fisherman.

Applicant's invention offers protection to the fly rod and reel not available in any other prior art device, an extremely important consideration when using a saltwater fly rod and reel. This is accomplished by Applicant's novel construction of a rod/reel container which fully encases the reel, even when the reel is attached to the rod.

In addition, Applicant's invention is configured such that it is universal, accepting nearly any size fly reel. No prior art rod/reel holder known to Applicant can safely store nearly any sized fly reel currently manufactured. Applicant believes, however, that his device is even more useful when produced in differing sizes, thereby more snugly accommodating the particular rod/reel combination.

Applicant's invention utilizes a container which is nearly "P" shaped, that is, when viewed from the side, Applicant's reel container appears shaped much the same as a letter "P". Configuration in this manner permits the insertion within the container of both the fly reel and the bottom-most portion of the fly rod, the bottom of the rod coming to rest in the leg of the "P" shaped container while the reel is completely encased within the semicircular upper section of the "P" shaped container.

Ingress and egress to the interior portion of Applicant's invention are by way of a hinged door locatable along the top-most surface of the device. The hinged door further incorporates a slot or "U" shaped cut-out which permits the door to be fully closed, encasing the fly reel, while permitting the fly rod to extend out of the top of the device. Thus, one needn't remove the reel from the rod in order to safely store the rod. Applicant's device therefore permits the person fishing to take his or her hands off the reel when necessary while fishing, and yet be able to immediately recover the rod/reel and continue fishing. As an example, a man fishing at the beach with his daughter who notices that she is playing with a barbed hook could quickly store the rod/reel without dropping it into the sand, and without wasting valuable moments before intervening in her actions. The rod/reel would be safely stored in a vertical position, keeping the end of the rod at which the fishing hook would hang, out of reach.

A further benefit of Applicant's invention is that the rod and reel are placed into the "P-shaped" container in a manner which requires no reorienting of the rod/reel while so doing. After reeling a lure in, one who is fly fishing already has his or her hand above the reel, with the rod nearly vertical. The position of the hinged door at the top of the "P-shaped" container permits the user to simply lower the rod/reel into the open container, and close the hinged door. There is no need to reposition the rod/reel or work it about in order to insert it within the instant invention's safe confines.

Furthermore, people who fish have long known that while fishing, it is not uncommon for the reel handle (used to turn the reel in order to retrieve and rewind the played out fishing line) to become wet and or sticky. By encasing, the entire reel within the "P-shaped" container, Applicant's invention provides the additional benefit of keeping the reel handle isolated from the elements (dirt, sand) while it is not being held. Unlike those holders which hold the reel but leave the reel handle exposed, Applicant's invention keeps the reel handle free of unwanted debris, when not being held. Furthermore, and equally importantly, the reel's spool is also fully encased within Applicant's device, providing additional protection from the intrusion of unwanted materials into the reel. This is important so that debris will not become affixed to the spool, and thereafter enter the interior mechanism of the reel, thereby causing serious damage to the reel's inner mechanisms.

The interior of the instant invention is configured such that it will accommodate both the fly reel, and the end of the rod which extends past the reel, away from the eyelets. This is a far better solution to the problem of "where do I put this pole down for a moment?" Furthermore, the interior of the instant invention includes a padding/spacing material which serves both to prevent the reel from moving about within the container, as well as ensuring that fly reels of differing sizes will be snugly encased. With Applicant's invention, one need not purchase a different sized holder for each different fly reel one has.

Applicant's invention includes a "spike" or similar support means attached to the "P-shaped" container which elevates the "P-shaped" container above the ground, as well as maintaining the holder in place. While many other configurations are possible (legs, pedestal, etc.), Applicant believes the spike is optimal as it may be used both on granular surfaces (such as a beach) and more solid surfaces (such as wedged between rocks along a river or planted firmly into the shoreline.

Finally, Applicant includes a loop mounted along the side surface of the "P-shape" container which permits the user to carry the device attached to his or her belt, or to string a sling through the loop for carrying over the shoulder.

G A DESCRIPTION OF THE PREFERRED EMBODIMENT

Figure 1:
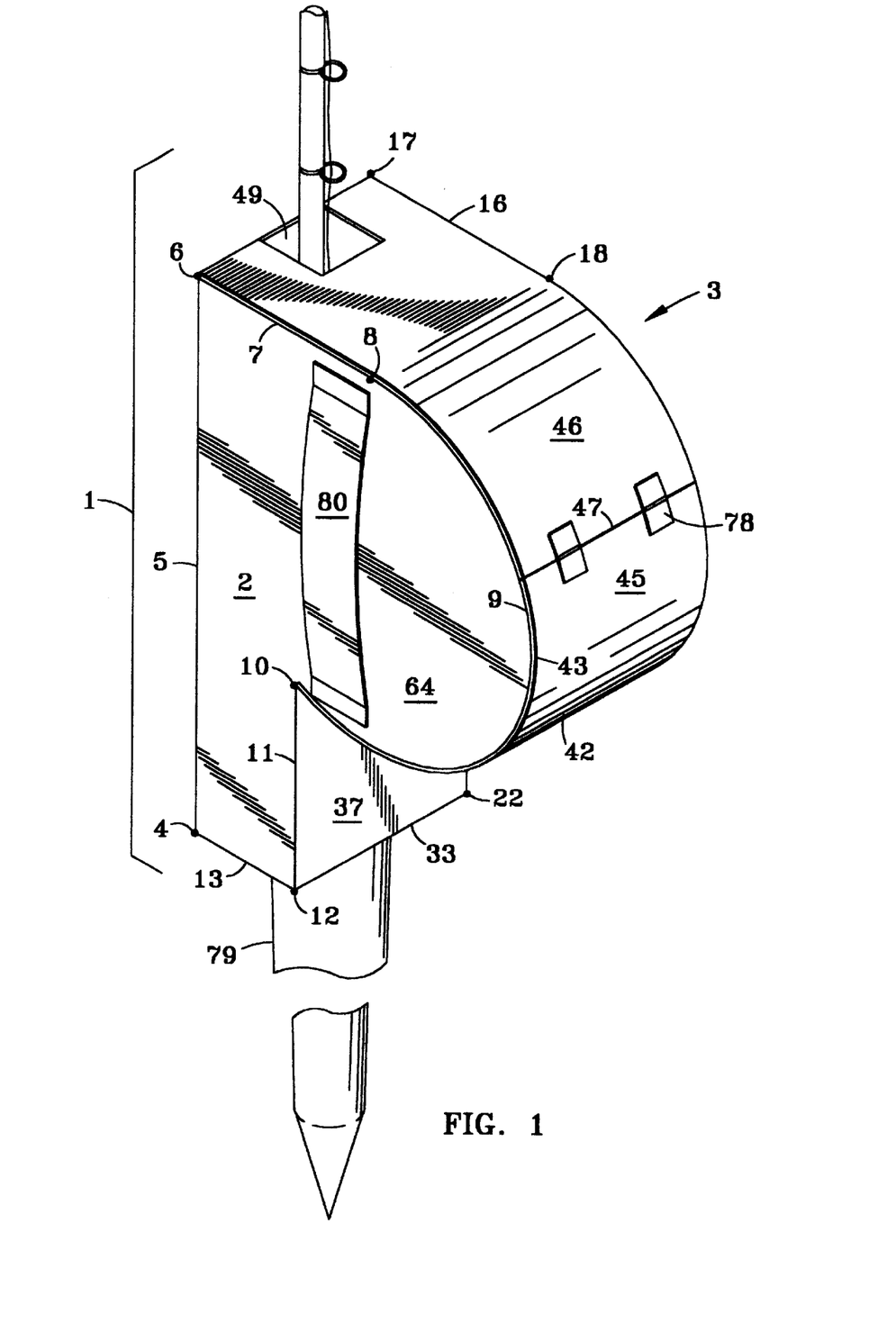
FIG. 1 is a perspective view of the fly fishing rod and reel holder with a fishing rod and reel contained therein.
Figure 2:
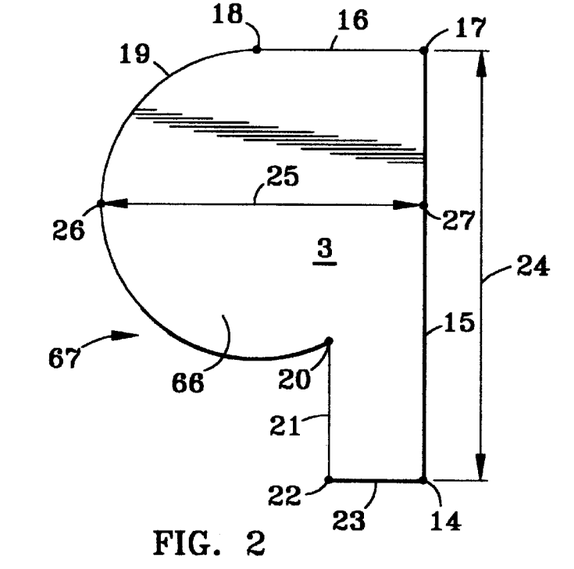
FIG. 2 is a plan view of the second side section of the fly fishing rod and reel holder.
Figure 4:
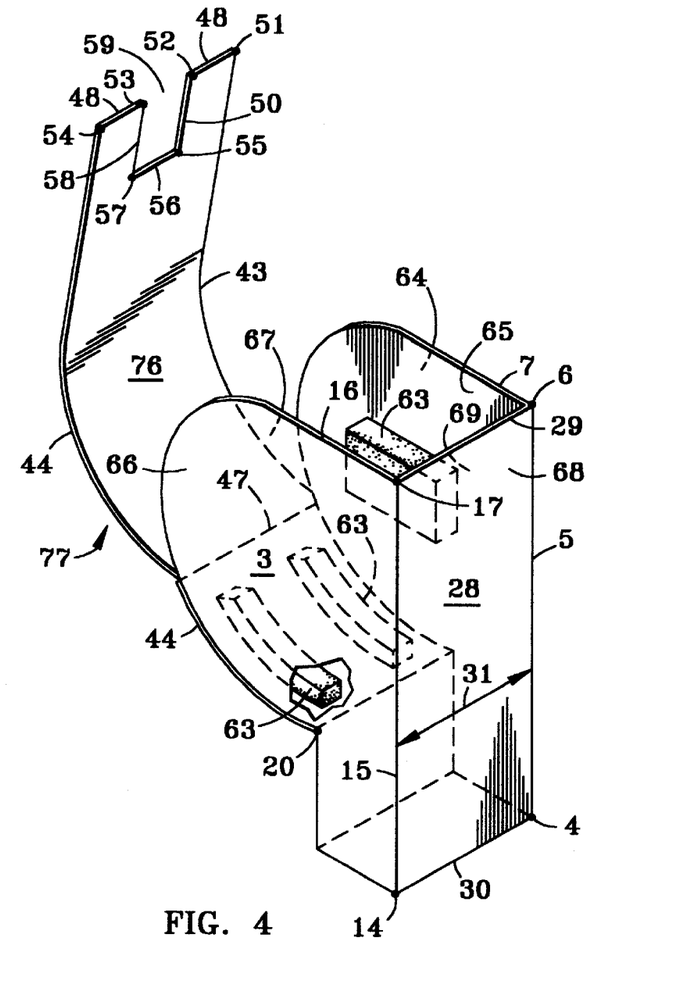
FIG. 4 is a perspective view showing the interior of the fly fishing rod and reel holder.

As per FIGS. 1, 2 and 4, the instant invention is configured in the best mode as a "P" shaped container (1). As such, it has a first side section (2) and a mirror image second side section (3). The first side section (2) may be described more fully with reference to a first point (4), and a first side section left edge (5) extending away from the first point (4). The first side section left edge (5) meets and merges into a first side section top edge (7) at a second point (6). The first side section left edge (5) is in the form of a straight line. The first side section top edge (7) extends away from the second point (6) to a third point (8). The first side section top edge (7) is in the form of a straight line, and is perpendicular to the first side section left edge (5). A first side section curved edge (9) extends away from the third point (8) to a fourth point (10). The first side section curved edge is in the form of an arc. A first side section right edge (11) extends downwardly, away from the fourth point (10) to a fifth point (12). The first side section right edge (11) is in the form of a straight line, is perpendicular to the first side section top edge (7), and parallel to the first side section left edge (5). A first side section bottom edge (13) extends away from the fifth point (12), toward the first point (4), the first side bottom edge merging into the first side section left edge (5) at the first point. As the first side section is a three dimensional object, it further has a first side section outward facing surface (64) and a first side section inward facing surface (65). It should be readily understood that the first side section outward facing surface and the first side section inward facing surface are both flat and planar.

As per FIGS. 2 and 4 the second side section (3) is a mirror image of the first side section (2), the second side section being further defined by a sixth point (14), and a second side section right edge (15) extending away from the sixth point (14). The second side section right edge (15) meets and merges into a second side section top edge (16) at a seventh point (17). The second side section right edge (15) is in the form of a straight line, and defines the instant invention's height (24). The second side section right edge (15) and the first side section left edge (5) are identical in height. The second side section top edge (16) extends away from the seventh point (17) to an eighth point (18). The second side section top edge (16) is in the form of a straight line, and is perpendicular to the second side section right edge (15). A second side section curved edge (19) extends away from the eighth point (18) to a ninth point (20). The second side curved edge is in the form of an arc. A second side section left edge (21) extends downwardly, away from the ninth point (20) to a tenth point (22). The second side section left edge (21) is in the form of a straight line, is perpendicular to the second side section top edge (16), and parallel to the second side section right edge (15). A second side section bottom edge (23) extends away from the tenth point (22), toward the sixth point (14), the second side bottom edge merging into the second side section right edge (15) at the sixth point. As the second side section is a three dimensional object, it further has a second side section outward facing surface (66) and a second side section inward facing surface (67). It should be readily understood that the second side section outward facing surface and the second side section inward facing surface are both flat and planar. When fully assembled, the first side section (2) and the second side section (3) are parallel, though not co-planar.

It may be further understood that the instant invention has container reel section width, the container reel section width (25) being one and the same as a straight line extended between an eleventh point (26) and a twelfth point (27), the eleventh point (26) being locatable along the second side section curved edge (19) midway between the eighth point (18) and the ninth point (20) of the second side section curved edge (19). The line defining container reel section width (25) is parallel to the second side section bottom edge (23), perpendicular to the second side right edge (15) and co-planar with the second side section outward facing surface (66). The twelfth point (27) being locatable along the second side right edge (15).

As per FIGS. 1, 2 and 4, the first side section (2) and the second side section (3) are connected to one another by a rear section (28). The rear section (28) is at a right angle to the first side section (2) and the second side section (3). When viewed from the rear, with the first side section top edge (7) and the second side section top edge (16) extending away from the viewer, the rear section (28) appears as being rectangular in form. The rear section may be understood as having a rear section right side edge, a rear section bottom edge (30), a rear section left side edge and a rear section top edge (29). When fully assembled, the right side edge of the rear section merges into and is one and the same with the first side section left edge (5) and the left side edge of the rear section merges into and is one and the same with the second side section right edge (15). The rear section top edge (29) is described by a straight line extending from the second point (6) to the seventh point (17). When filly assembled, the rear section bottom edge (30) is one and the same as a straight line extending from the sixth point (14) to the first point (4). The rear section top edge (29) and the rear section bottom edge (30) are equal in length, that length defining the instant invention's depth (31). Furthermore, the rear section top edge and the rear section bottom edge are parallel to one another, and co-planar. As the rear section is a three dimensional object, it further has a rear section outward facing surface (68) and a rear section inward facing surface (69).

Figure 5:
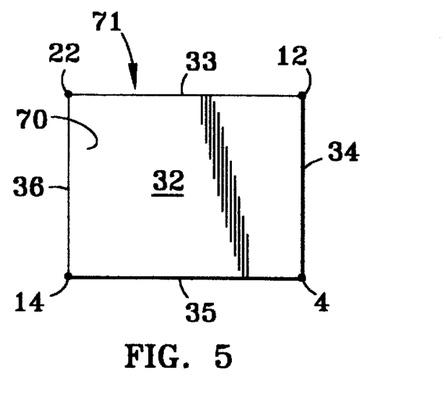
FIG. 5 is a plan view of the bottom section of the fly fishing rod and reel holder.

As per FIG. 5, the instant invention further has a bottom section (32). The bottom section is essentially rectangular in form. When fully assembled, the four corners of the bottom section may be defined by the first point (4), the sixth point (14), the tenth point (22), and the fifth point (12). The bottom section may be described as a bottom section forward edge (33) which extends from the tenth point (22) to the fifth point (12), a bottom section first side edge (34) which extends from the fifth point (12) to the first point (4), a bottom section rearward edge (35) which extends from the first point (4) to the sixth point (14) and a bottom section second side edge (36) which extends from the sixth point (14) to the tenth point (22). As the bottom section is a three dimensional object, it further has a bottom section outward facing surface (71) and a bottom section inward facing surface (70). The bottom section rearward edge (35) and the bottom section forward edge (33) are parallel and co-planar. The bottom section first side edge (34) and the bottom section second side edge (36) are parallel and co-planar. The bottom section forward edge (33) and the bottom section first side edge (34) are perpendicular and co-planar. Applicant believes it may be desireable to provide drainage means through the bottom section (32). This may be accomplished, for example, by drilling holes which pass through both the outward facing surface (71) and the inward facing surface (70), thereby providing a means for any liquid which may have accumulated in the device, to exit same.

As per FIGS. 1, 2, 4 and 5, it should be readily understood that when fully assembled, the bottom section first side edge (34) merges into, and is one and the same with the first side section bottom edge (13), the bottom section rearward edge (35) merges into, and is one and the same with the rear section bottom edge (30) and the bottom section second side edge (36) merges into, and is one and the same with the second side section bottom edge (23).

Figure 6:
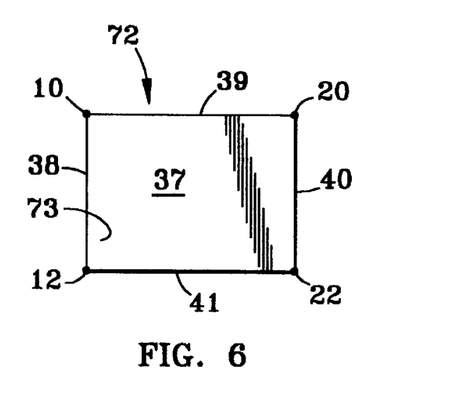
FIG. 6 is a plan view of the front lower section of the fly fishing rod and reel holder.

As per FIGS. 1 and 6, the instant invention further has a front lower section (37). The front lower section is essentially rectangular in form. When fully assembled, the four corners of the front lower section may be defined by the fifth point (12), the fourth point (10), the ninth point (20), and the tenth point (22). The front lower section may be further described as having a front lower section bottom edge (41) which extends from the tenth point (22) to the fifth point (12), a front lower section left side edge (38) which extends from the fifth point (12) to the fourth point (10), a front lower section top edge (39) which extends from the fourth point (10) to the ninth point (20) and a front lower section right side edge (40) which extends from the ninth point (20) to the tenth point (22). As the front lower section is a three dimensional object, it further has a front lower section outward facing surface (73) and a front lower section inward facing surface (72). The front lower section bottom edge (41) and the front lower section top edge (39) are parallel and co-planar. The front lower section left side edge (38) and the front lower section right side edge (40) are parallel and co-planar. The front lower section top edge (39) and the front lower section left side edge (38) are perpendicular and co-planar.

As per FIGS. 1, 2, 5 and 6, it should be readily understood that when fully assembled, the front lower section bottom edge (41) merges into, and is one and the same with the bottom section forward edge (33), the front lower section left edge (38) merges into, and is one and the same with the first side section right edge (11) and the front section right edge (40) merges into, and is one and the same with the second side section left edge (21). As per FIGS. 1, 2 and 4, when fully assembled, the instant invention further has a front upper section (42). The front upper section is essentially an arch in form, the arch having four terminating points, the four terminating points being defined by the third point (8), the eighth point (18), the ninth point (20), and the fourth point (10). The front upper section may be further defined as having a front upper section first edge (43) extending from the fourth point (10) to the third point (8), a front upper section second edge (44) extending from the eighth point (18) to the ninth point (20) and a front upper section second terminating edge extending from the fourth point (10) to the ninth point (20).

As per FIG. 1, the arch form of the front upper section ceases at the third point (8) and the eighth point (18). The front upper section then extends toward the rear section top edge (29). This extension of the front upper section is referred to as the front upper section flattened portion. The front upper section flattened portion extends from the third point (8) to the second point (6) and from the eighth point (18) to the seventh point (17).

As per FIG. 4, the front upper section flattened portion terminates at a front upper section first terminating edge (48), the front upper section first terminating edge extending from a thirteenth point (51) to a fourteenth point (52) then from a fifteenth point (53) to a sixteenth point (54), with a gap separating the fourteenth point (52) from the fifteenth point (53). When fully assembled, and with the device closed, the front upper section second terminating edge is one and the same with the front lower section top edge (39) and the front upper section first terminating edge (48) is adjacent to the rear section top edge (29). Like the other sections of the device thus far described, the front upper section is a three dimensional object having an inward facing surface and an outward facing surface.

As per FIGS. 1 and 4, the front upper section may be better understood by describing it as including a front upper section stationary portion (45) and a front upper section movable portion (46). A slit (47) passes completely through the inward facing and outward facing surfaces of the front upper section, the slit extending from the front upper section first edge (43) to the front upper section second edge (44), the slit forming the division line separating the front upper section stationary portion and the front upper section movable portion. Furthermore, the slit (47) is parallel to the front upper section first terminating edge (48), though may not be co-planar, and permits the front upper section movable portion to move independently of the front upper section stationary portion. The front upper section movable portion (46) is pivotably attached to the front upper section stationary portion (45) by pivot means which permit the front upper section movable portion to pivot in relation to the front upper section stationary portion. The action of the front movable portion may also be referred to as "swinging open", that is, the front movable portion may be considered as "swingably" attached. Thusly, the front upper section movable portion may be readily understood to be a pivotably or swingably closable cover. In the preferred embodiment, the pivot means is a pair of hinges (78), though other means such as a flexible rubber sheet or pivot pin spanning the slit and attaching the front upper section movable portion (46) to the front upper section stationary portion (45) would work equally well. The front upper section has been described as having outward facing and inward facing surfaces. Since the front upper section stationary portion and the front upper section movable portion are portions of the front upper section, they too must have inward facing and outward facing surfaces. Therefore, it should be readily understood that the device has a front upper section stationary portion outward facing surface (75) and a front upper section stationary portion in ward facing surface (74). Furthermore, the front upper section movable portion has a front upper section movable portion outward facing surface (77) and a front upper section movable portion inward facing surface (76). It should be further understood that the front upper section flattened portion is an extension of the front upper section movable portion.

As per FIGS. 1 and 4, it should be noted that when fully assembled, in the preferred embodiment the front upper section first edge (43) merges into and is one and the same with the first side section curved edge (9) between the fourth point (10) and the slit (47). So too, when fully assembled, the front upper section second edge (44) merges into and is one and the same with the second side section curved edge (19) between the ninth point (20) and the slit (47).

As per FIGS. 1 and 4, the front upper section movable portion has a cut-out (49). The cut-out is essentially "U" shaped, having a cut-out first side edge (50) a cut out closed end edge (56), a cut out second side edge (58) and a cut-out open end (59) and is further defined by the cut-out first side edge (50) extending from the fourteenth point (52) to a seventeenth point (55), the cut out closed end edge (56) extending from the seventeenth point (55) to an eighteenth point (57), the cut-out second side edge (58) extending from the eighteenth point (57) to the fifteenth point (53), and the cut out open end (59) extending from the fifteenth point (53) to the fourteenth point (52). It should be understood that the cut out open end (59) defines the gap between the fifteenth point (53) and the fourteenth point (52). It should be further understood that the cut-out first side edge (50) and the cut out second side edge (58) are parallel to the front upper section first edge (43) and the front upper section second edge (44), while the cut out closed end edge (56) is parallel to front upper section first terminating edge (48). The length of the cut out closed end edge (56) and the distance of the gap between the fifteenth point (53) and the fourteenth point (52) should be equal. Also, the length of the cut-out first side edge (50) and the cut-out second side edge (58) should be equal. As per FIG. 1, when fully assembled, and in use, the fly fishing rod will extend through the cut-out (49). Given that fly fishing rods come in various lengths and diameters, it may be desirable to modify the length of the cut-out first side edge and the cut-out closed end edge in order to accommodate fly fishing rods of differing diameters.

Figure 3:
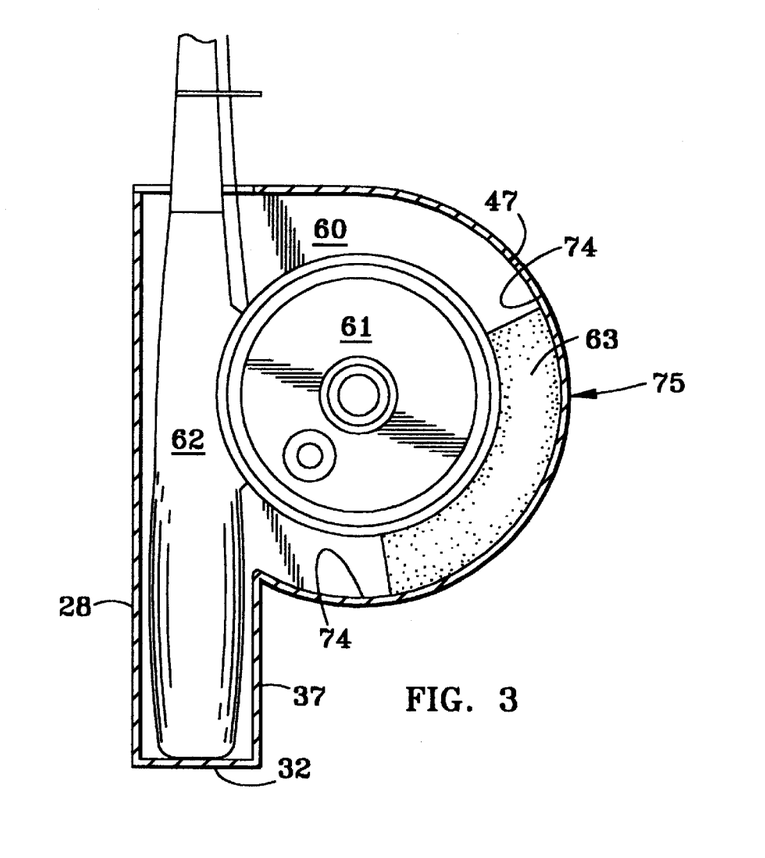
FIG. 3 is a cross-sectional view showing the interior of the fly fishing rod and reel holder with a fly fishing rod and reel contained therein.

As per FIGS. 1, 3 and 4, the instant invention has a hollow interior compartment (60) for storage therein of the fishing reel (61) and the handle section of the fishing rod (62). When the instant invention is closed, that is, when the front upper section movable portion is directly in contact with the first side section top edge (7) and the second side section top edge (16), the hollow interior compartment is bounded by the first side section inward facing surface (65), the second side section inward facing surface (67) the rear section inward facing surface (69), the bottom section inward facing surface (70), the front lower section inward facing surface (72), the front upper section stationary portion inward facing surface (74), and the front upper section movable portion inward facing surface (76).

As per FIG. 4, in the preferred embodiment, padding strips (63) are removably attached in the hollow interior compartment (60). These padding strips function to both cushion the rod/reel combination when lodged inside the hollow interior compartment, and act to prevent the rod/reel combination from moving about within the hollow interior compartment. Because rod/reel combinations may be of different dimensions, it is desirable that the padding strips be removable such that padding strips having differing thicknesses may be attached within the hollow interior compartment. In this way, when placing a rod/reel combination having smaller overall dimensions than a rod/reel combination which had been placed within the hollow interior compartment previously, the user may replace the previously attached padding strips with thicker and or additional padding strips thereby taking up the space not occupied by the smaller rod/reel combination. In the preferred embodiment, the padding strips are foam rubber and are removably attached to the hollow interior compartment using self adhesive Velcro or similar material. However, other suitable means for attachment which would permit the removal and replacement of the padding means would work equally well. An example of other such means might be a strip of magnetized material glued to the interior surface of the device, and a corresponding strip of magnetized material glued to the padding material. The two magnetized areas would removably attach the padding when placed within the device.

Given that there are differences in the overall dimensions of fly fishing reels, and that the length and diameter of the fishing rod handle, Applicant believes it is desirable to allow the user of the device to decide precisely where, within the hollow interior compartment, he or she will locate the padding strips (63). The padding strips obviously may be placed on the first side section inward facing surface (65), the second side section inward facing surface (67) the rear section inward facing surface (69), the bottom section inward facing surface (70), the front lower section inward facing surface (72), the front upper section stationary portion inward facing surface (74), and the front upper section movable portion inward facing surface (76), the precise placement being up to the device's user.

While the device has been described by way of a number of components which are then fastened to one another in order to assemble the device, it should be clear that the device may be manufactured as one compete unit. This may be accomplished, for example, by the process commonly known as injection molding. However, in such a case, it would still be necessary to form the upper section movable portion separately from the remainder of the device so that the upper section movable portion could pivot in relation to the upper section stationary portion of the device. Furthermore, while the preferred embodiment of the device utilizes thin, substantially rigid sheets of plastic as the material from which the device is constructed, Applicant contemplates that other materials could be used instead. For example, the device could be constructed of aluminum, or other similar metal so long as when completely assembled, the device was substantially rigid. Furthermore, the device could be constructed of wood, or polycarbon laminates, again, with the same limitation, to wit, that the completely assembled device be substantially rigid and be capable of enclosably holding the fly fishing reel and the fly fishing rod handle.

It should be further recognized that although the preferred embodiment is described as being "P" shaped, many other configurations would work equally well, so long as the fly fishing reel and fly fishing rod handle are completely encased within the device. For example, it is possible for the device to be configured as a rectangular box. In this case, the front upper section stationary portion would be rectangular in form, and when combined with the front lower section, would be of the same dimensions as the rear section. When configured thusly, the front upper section movable portion is of the same dimensions as the bottom section. Furthermore, when so configured, the pivot means would be attached to the front upper section movable portion and any one of the adjacent perpendicular sides, such as the first side section or the second side section or the rear section or the front upper section. It should also be understood that when configured in this manner, the side sections are no longer "P" shaped, but are rather rectangular in form.

In another embodiment of the device, it is generally rectangular, as described above. However, the front upper section, when combined with the front lower section, is shorter than the rear section (shorter being in reference to the device's height). The front section movable portion is then generally rectangular in form, and sits at an obtuse angle in relation to the bottom section. Again, the pivot means may be mounted as per the description of the rectangular embodiment set forth above. When considering the many possible configurations of the instant device, it is useful to refer to the first side section, the second side section, the rear section, the front lower section and the front upper section as container walls. It is also useful to refer to the bottom section as a container bottom. The front upper section movable portion may be referred to as a container top.

The function and use of the device should now be readily apparent. When the user of the device has decided upon a location at which the device will be set up, he or she inserts the spike (79) (also known as a stake) into the ground sufficiently such that the device will stand in place, the spike extending vertically from the ground. In the preferred embodiment, the spike has a first end, a second end and a middle, the middle connecting the first end and the second end, the second end being pointed. The spike has a length of approximately one and one half feet and is attached directly to the bottom section outward facing surface (71). The end of the spike opposite the bottom section outward facing surface is preferably conical or "pointed" for easy insertion into the ground. Naturally, the spike is but one possible support means which may be useful for the instant device. Other such support means might be used instead, so long as the device was anchored to the surface upon which it is to be used, and its position remained steady in reference to that surface. An example of other such support means would be a spike having legs at the second end rather than a point.

The person using the device, upon deciding to put the rod and reel down, simply opens the front upper section movable portion (46) by grasping it and pivoting it upwardly and away from the rear section (28). By so doing, the hollow interior compartment (60) becomes accessible.

Once the hollow interior compartment is accessible, the user of the device places the reel and rod handle within the hollow interior compartment. The padding strips (63) should already have been placed within the hollow interior compartment, and therefore the reel will be snugly and enclosably held within the hollow interior compartment. The user next closes the front section movable portion (46), thereby completely enclosing the reel and lower section of the rod handle within the hollow interior compartment of the device. The fly fishing rod will protrude through the cut-out (49). The device now holds the entire reel and rod handle within the hollow interior compartment, and prevents the intrusion into the reel of unwanted materials, as well as minimizing the opportunity for breakage of the handle.

Although not shown in the drawings, it may be desirable to incorporate a means for maintaining closure of the device. This may easily be accomplished by the addition of a clasp which would firmly connect the front section movable portion (46) to either the first side section (2) or the second side section (3). Another means considered by the Applicant is to substitute Velcro for the clasp. However, irrespective of which means for maintaining closure is used, the operability of the device would not be affected. In fact, Applicant contemplates that it may be desirable to utilize pivot means which incorporate means for biasing so that the front section movable portion remains closed unless purposely opened by the user. For example, spring loaded hinges could be used to accomplish this purpose.

Furthermore, it may be useful to apply a substantially soft, pliable material along the cut-out first side edge (50), the cut out second side edge (58) and the cut out closed end edge (56). Applicant believes such an arrangement may be desirable in order to minimize the possibilities of damage to the fly rod. Such substantially soft, pliable material along the cut-out first side edge, cut-out second side edge and cut-out closed end edge would ensure that these edges would not damage the fly rod. In the preferred embodiment, Applicant utilizes a foam rubber strip which is glued to the cut-out first side edge, the cut-out second side edge and the cut-out closed end edge.

Finally, as per FIG. 1, Applicant believes it may be desirable to incorporate a "carry strap" (80) onto the device. The carry strap would be made from a strong, pliable material and would preferably be essentially rectangular in form, have a first end, a middle section and a second end, the middle section connecting the first end and the second end and would be attached to the instant device. In the preferred embodiment, the strap is made from leather. The strap first end is glued to the first side section outward facing surface and the strap second end is also glued to the first side section outward facing surface. The strap middle is left free, and thereby permits the insertion of a belt or shoulder strap therethrough. Though in the preferred embodiment the strap is attached to the first side section, it could just as easily be attached to the second side section outward facing surface or rear section outward facing surface instead. In the even that the rectangular form is chosen rather than the "P" shaped one, the strap could be fastened instead on the front lower section outward facing surface.

I claim:

1. A fly fishing rod and reel holder comprising;
   A. a "P" shaped container,
      I. the "P" shaped container having a first side section and a second side section,
         a. the first side section having an inward facing surface and an outward facing surface,
         b. the second side section having an inward facing surface and an outward facing surface,
      II. the "P" shaped container having a rear section,
         a. the rear section having an inward facing surface and an outward facing surface,
         b. the rear section connecting the first side section and the second side section,
      III. the "P" shaped container having a front lower section,
         a. the front lower section having an inward facing surface and an outward facing surface,
         b. the front lower section connecting the first side section and the second side section,
            i. the front lower section being parallel to the rear section,
      IV. the "P" shaped container having a front upper section,
         a. the front upper section having an inward facing surface and an outward facing surface,
         b. the front upper section being attached to the front lower section and adjacent to the first side section and the second side section,
         c. the front upper section having a stationary portion, a movable portion and a flattened portion,
            i. the stationary portion being adjacent to the front lower portion, the first side section and the second side section,
            ii. the movable portion being pivotably attached to the stationary portion by pivot means, and adjacent to the first side section and the second side section,
               aa. the stationary port on and the movable portion together are in the form of an arch,
            iii. the flattened portion being adjacent to the movable portion, the first side section, the second side section and the rear section,
               aa. the flattened portion having a cut-out,
      V. the "P" shaped container having a bottom section,
         a. the bottom section having an inward facing surface and an outward facing surface,
         b. the bottom section being attached to the first side section, the second side section, the rear section and the front lower section,
      VI the "P" shaped container having a hollow interior compartment,
         a. the hollow interior compartment being bounded by the first side section inward facing surface, the second side section inward facing surface, the rear section inward facing surface, the front lower section inward facing surface, and the front upper section inward facing surface,
   B. a support means,
      I. the support means being attached to the bottom section outward facing surface,
      II. the support means raising the fly fishing rod and reel holder above the elevation of the land upon which the support means is located,
      III. the support means being substantially rigid so that the fly fishing rod and reel holder is stable.

2. The fly fishing rod and reel holder according to claim 1 further comprising;
   A. removable padding means,
      I. the removable padding means being locatable within the container hollow interior compartment,
      II. the removable padding means being removably attached to the inward facing surface.

3. A fly fishing rod and reel holder comprising;
   A. a "P" shaped container,
      I. the "P" shaped container having a first side section
         a. the first side section having a left edge, a top edge, a curved edge, a right edge and a bottom edge,
         b. the first side section having an outward facing surface and an inward facing surface,
            i. the first side section left edge, top edge, curved edge, right edge, and bottom edge defining a periphery of the first side section outward facing surface and the inward facing surface,
      II. the "P" shaped container having a rear section,
         a. the rear section having a right side edge, a top edge, a left side edge and a bottom edge,
         b. the rear section right side edge being attached to the first side section left edge,
         c. the rear section having an inward facing surface and an outward facing surface,
            i. the rear section left edge, top edge, curved edge, right edge, and bottom edge defining a periphery of the rear section outward facing surface and the inward facing surface,
      III. the "P" shaped container having a second side section, a. the second side section having a left edge, a top edge, a curved edge, a right edge and a bottom edge,
b. the second side section right edge being attached to the rear section left edge,
c. the second side section having an outward facing surface and an inward facing surface,
   i. the second side section left edge, top edge, curved edge, right edge, and bottom edge defining a periphery of the second side section outward facing surface and the inward facing surface,
IV. the "P" shaped container having a front lower section,
   a. the front lower section having a left side edge, a top edge, a bottom edge, and a right side edge,
      i. the front lower section right side edge being attached to the second side section left edge,
      ii. the front lower section left side edge being attached to the first side section right edge,
   b. the front lower section having an outward facing surface and an inward facing surface,
      i. the front lower section left side edge, top edge, right side edge and bottom edge defining a periphery of the front lower section outward facing surface and the inward facing surface,
V. the "P" shaped container having a bottom section,
   a. the bottom section having a first side edge, a forward edge, a second side edge and a rearward edge,
      i. the first side edge being attached to the first side section bottom edge,
      ii. the forward edge being attached to the front lower section bottom edge,
      iii. the second side edge being attached to the second side section bottom edge,
      iv. the rearward edge being attached to the rear section bottom edge,
   b. the bottom section having an inward facing surface and an outward facing surface,
      i. the bottom section first side edge, forward edge, second side edge and rearward edge defining a periphery of the bottom section outward facing surface and the inward facing surface,
VI. the "P" shaped container having a front upper section,
   a. the front upper section having a second terminating edge, a first edge, a second edge, and a first terminating edge,
      i. the second terminating edge being attached to the front lower section top edge,
      ii. the first edge being adjacent to the first side section curved edge,
      iii. the second edge being adjacent to the second side section curved edge,
      iv. the first terminating edge being adjacent to the rear section top edge,
   b. the front upper section having an outward facing surface and an inward facing surface,
      i. the front upper section second terminating edge, first edge, second edge and first terminating edge defining a periphery of the front upper section outward facing surface and the inward facing surface,
   c. the front upper section having a slit,
      i. the slit extending from the first edge to the second edge,
      ii. the slit passing completely through the inward facing surface and the outward facing surface,
   d. the front upper section having a stationary portion, a movable portion and a flattened portion,
      i. the stationary portion being separated from the movable portion by the slit,
      ii. the stationary portion being adjacent to the front lower portion, the first side section and the second side section,
      iii. the movable portion beings pivotably attached to the stationary portion by pivot means, and adjacent to the first side section and the second side section,
      aa. the stationary portion and the movable portion together are in the form of an arch,
      iv. the flattened portion being adjacent to the movable portion, the first side section, the second side section and the rear section,
      aa. the flattened portion having a cut-out,
      aaa. the cut-out being essentially "U" shaped,
      bbb. the cut-out having a first side edge, a
      ccc. closed end edge, a second side edge and an open end, the open end being adjacent to the rear section top edge,
   VII. the "P" shaped container having a hollow interior compartment,
      a. the hollow interior compartment being bounded by the first side section inward facing surface, the second side section inward facing surface, the rear section inward facing surface, the front lower section inward facing surface, and the front upper section inward facing surface,
B. a support means,
   I. the support means having a first end, a second end and a middle, the middle connecting the first end to the second end,
      a. the first end being attached to the container bottom outward facing surface,
      b. the middle being essentially rod shaped,
      c. the second end being configured for stable contact with earth and similar materials.
4. The fly fishing rod and reel holder according to claim 3 further comprising;
A. removable padding means,
   I. the removable padding means being locatable within the container hollow interior compartment,
   II. the removable padding means being removably attached to the inward facing surface.

* * * * *